United States Patent [19]
Break et al.

[11] Patent Number: 5,421,231
[45] Date of Patent: Jun. 6, 1995

[54] PORTABLE SAW TABLE

[75] Inventors: Douglas G. Break, Lake; Arthur B. Chubb, Romulus; Daniel J. Spencer, Taylor; James E. Suyak, Lincoln Park, all of Mich.

[73] Assignee: Tapco Products Company, Inc., Plymouth, Mich.

[21] Appl. No.: 119,888

[22] Filed: Sep. 10, 1993

Related U.S. Application Data

[63] Continuation of Ser. No. 840,319, Feb. 24, 1992, abandoned.

[51] Int. Cl.⁶ .............................................. B27B 5/20
[52] U.S. Cl. ................................. 83/471.3; 83/486.1; 83/574; 83/581; 83/614; 144/286 A; 144/287; 144/379; 108/13
[58] Field of Search ............... 83/455, 468, 471.3, 83/477.2, 481, 486.1, 574, 581, 614; 144/286 R, 286 A, 287, 379; 108/11, 13

[56] References Cited

U.S. PATENT DOCUMENTS

| | | | |
|---|---|---|---|
| 2,739,624 | 3/1956 | Haddock | 83/486.1 X |
| 2,833,609 | 5/1958 | Lawless | 108/13 X |
| 3,130,758 | 4/1964 | McKinley | 83/486.1 X |
| 3,574,315 | 4/1971 | Boultinghouse | 83/490 |
| 3,821,918 | 7/1974 | Niehaus et al. | 83/471.3 |
| 3,872,755 | 3/1975 | Marsh et al. | 83/486.1 X |
| 3,955,456 | 5/1976 | Van Cleave | 83/486.1 X |
| 3,964,361 | 6/1976 | Allaire | 83/471.3 |
| 4,135,419 | 1/1979 | Chapin | 83/471.3 |
| 4,181,057 | 1/1980 | Bassett | 83/471.3 X |
| 4,197,775 | 4/1980 | Handler et al. | 83/471.3 |
| 4,452,117 | 6/1984 | Brickner et al. | 83/471.3 X |
| 4,561,336 | 12/1985 | Davis | 144/287 X |
| 4,890,657 | 1/1990 | Shelhorse | 83/471.3 X |
| 5,080,152 | 1/1992 | Collins et al. | 144/134 |

*Primary Examiner*—Richard K. Seidel
*Assistant Examiner*—Raymond D. Woods
*Attorney, Agent, or Firm*—Barnes, Kisselle, Raisch, Choate, Whittemore & Hulbert

[57] ABSTRACT

A portable saw table comprising a saw track pivotally supported on a saw table. A protractor is mounted on the saw track and an indicator-indexer plate is mounted on the saw table. A hand operated locking mechanism is provided. The saw table includes laterally extensible side members and longitudinally extending end members.

41 Claims, 7 Drawing Sheets

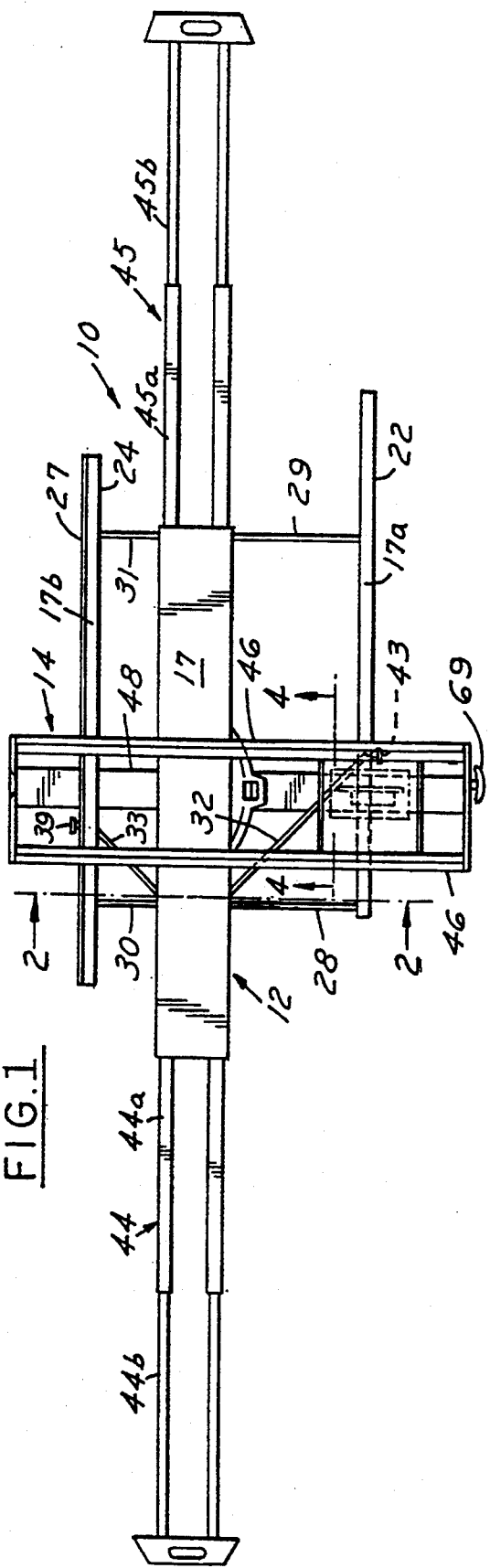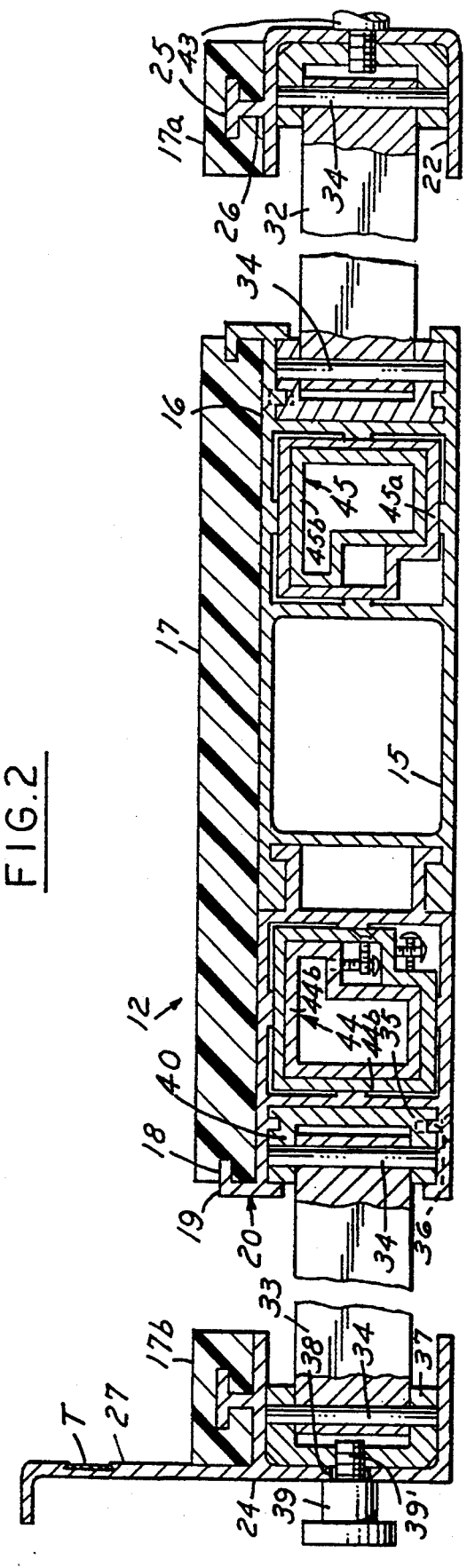

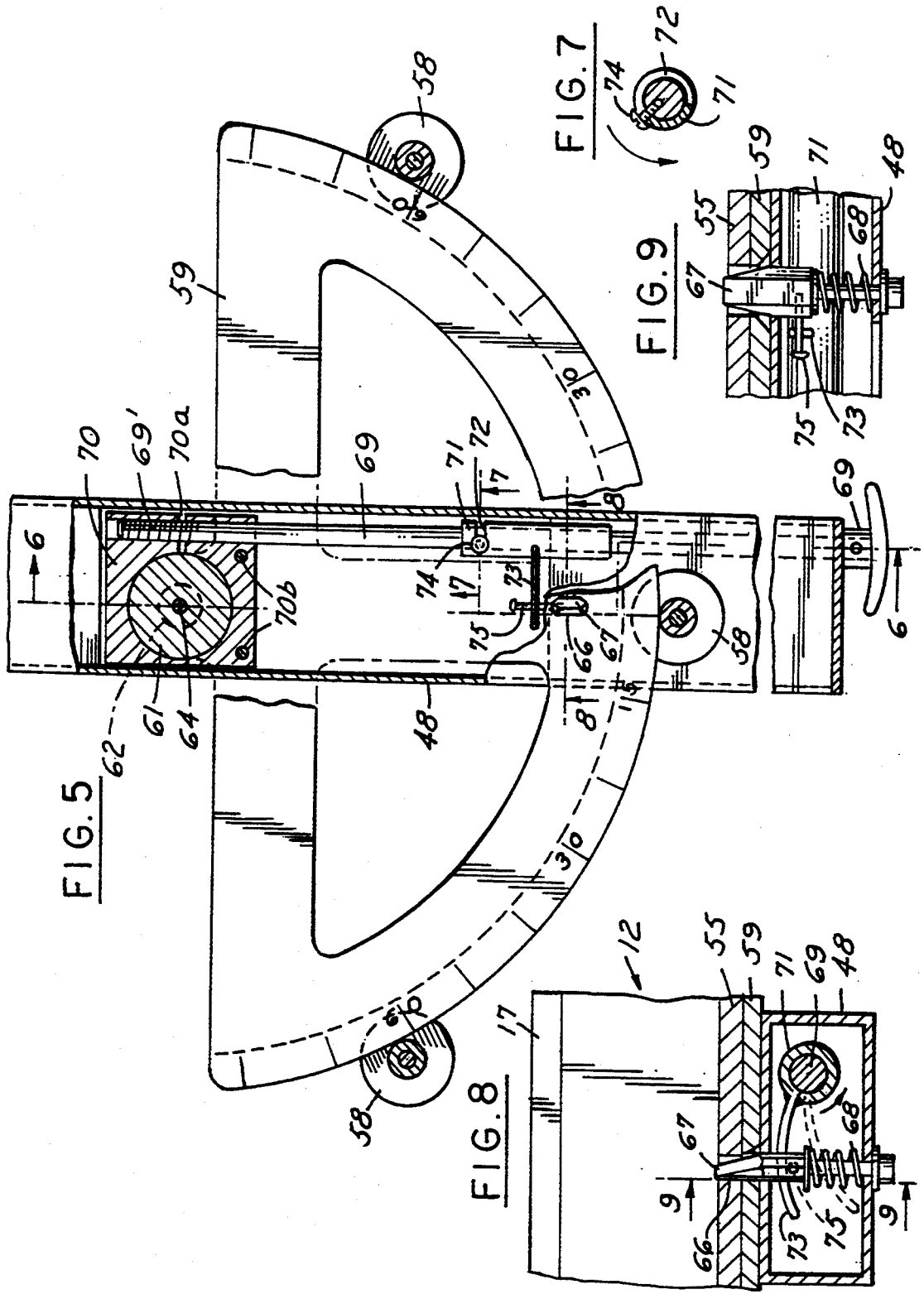

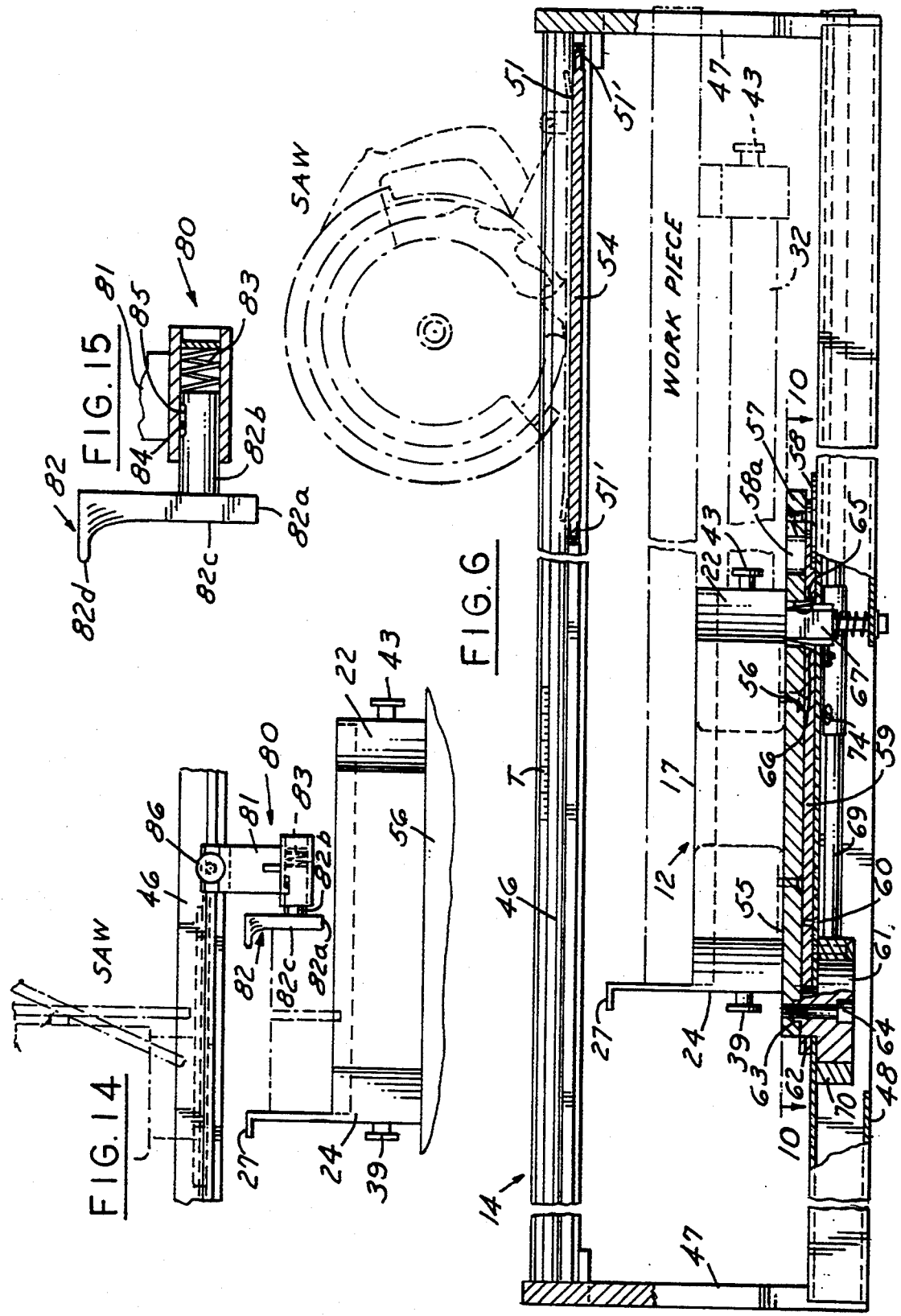

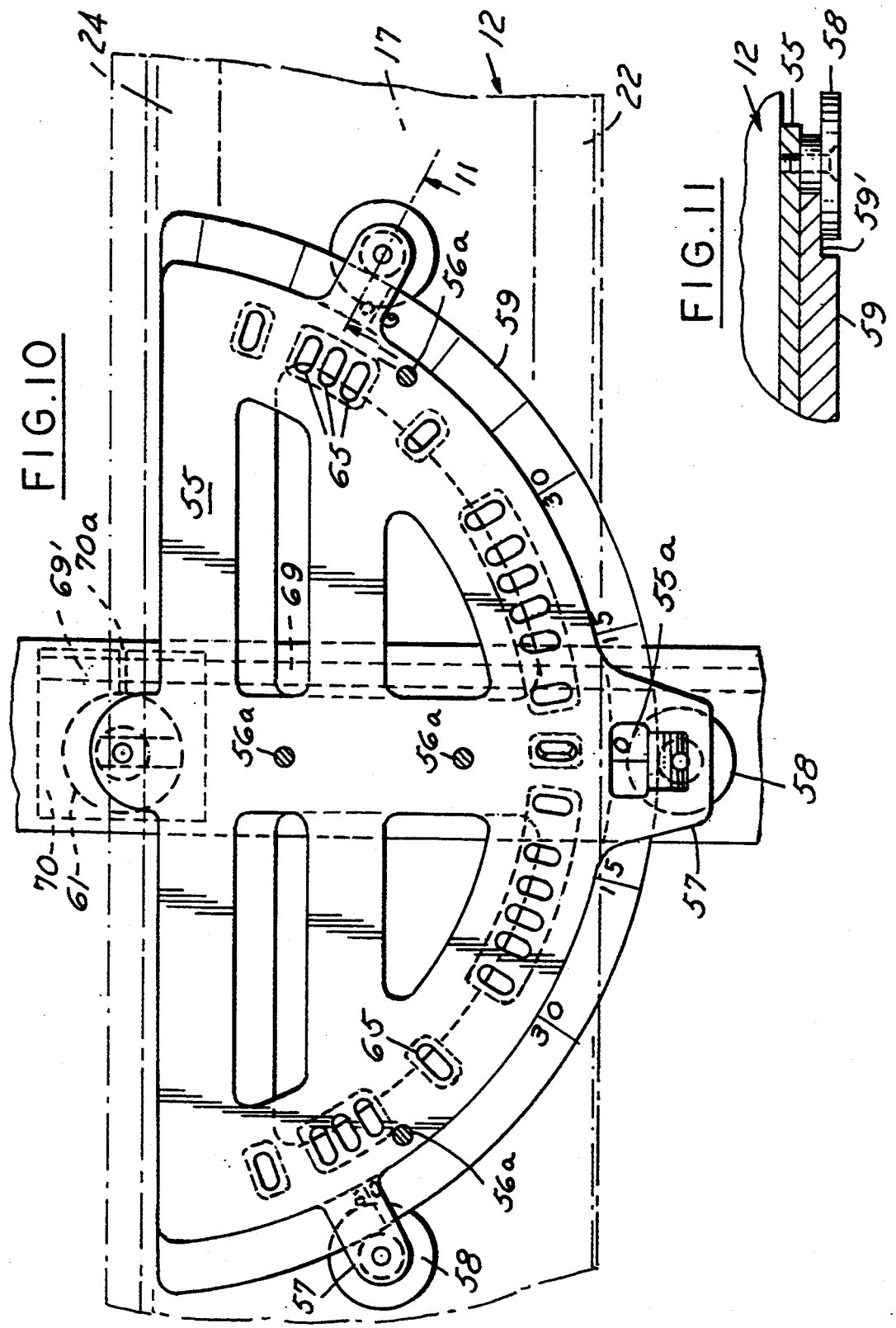

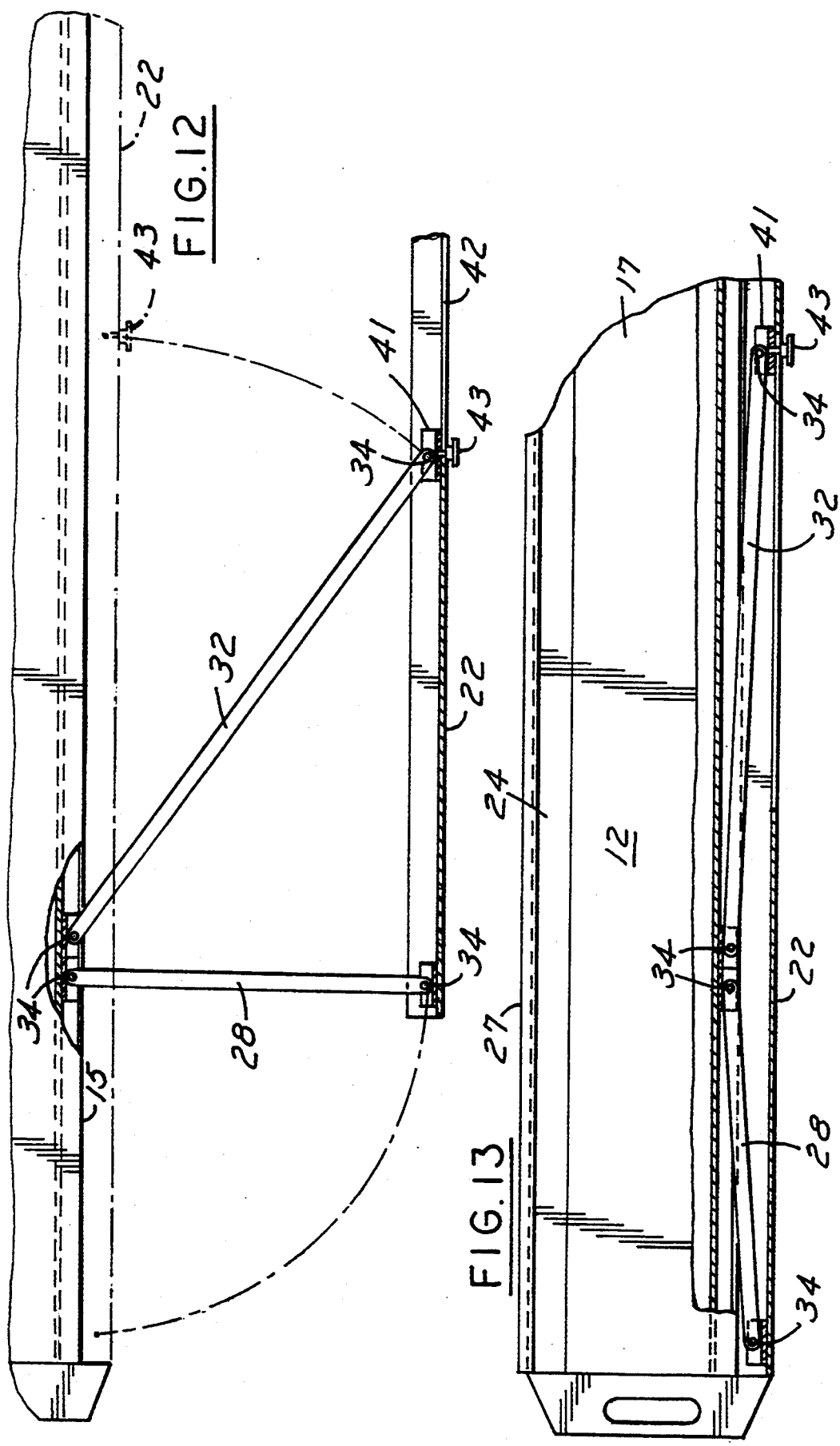

PORTABLE SAW TABLE

This application is a continuation of application Ser. No. 07/840,319, filed Feb. 24, 1992, now abandoned.

BACKGROUND OF THE INVENTION

Portable saw tables are commonly used at building sites. Typical patents showing portable saw tables are U.S. Pat. Nos. 3,821,918, 4,452,117 and 4,197,775.

Among the objectives of the present invention are to provide a portable saw table which utilizes a standard power tool such as a saw or router; which can be used to provide a wide range of angular positions relative to a workpiece; and which can be positioned to operate in two positions at a right angle to one another.

In accordance with the invention, the saw table accommodates a standard portable power tool, such as a circular saw or router, which may be positioned in any one of two positions at right angles to each other as may be desired for various operations, such as cross-cutting and rip-cutting operations of a circular saw. The power tool may be easily moved from one position to another without remounting the tool simply by withdrawing the saw slide from the ends of tracks.

The saw table includes a protractor on the saw track and an indicator on the saw table whereby a wider range of angles between the saw table and saw track can be obtained than has heretofore thought to be possible.

More specifically, the saw table of the invention accommodates a power tool mounted on a square saw slide slidably mounted on a saw track comprising channels on a pair of spaced, parallel guide tracks pivotally supported on the saw table. Cross-cutting or rip-cutting operations may be performed without requiring any remounting or resetting of a standard power saw on the saw slide.

The invention provides for greater flexibility in cutting operations by the novel pivotal mounting of the saw track to the saw table. The saw track is pivotally mounted with a protractor indicating the degree of movement with a handle for the fixed indicator and adjustable stops allowing for one-hand adjustment operations.

The invention also provides for an adjustable work table surface which has an adjustable table width for accommodating materials up to fifty two inches wide and extensions for extra table length to hold long material up to five feet on both sides of the table.

BRIEF DESCRIPTION OF THE DRAWINGS

FIG. 1 is a plan view of saw table with full extensions in accordance with the present invention;

FIG. 2 is a cross sectional view of the saw table taken substantially along the line 2—2 of FIG. 1;

FIG. 5 is a partially broken view of the protractor showing the indicator and adjustable stops;

FIG. 6 is a view taken substantially along line 6—6 of FIG. 5;

FIG. 7 is a cross sectional view taken substantially along line 7—7 of FIG. 5;

FIG. 8 is a cross sectional view taken substantially along line 8—8 of FIG. 5;

FIG. 9 is a cross sectional view taken substantially along line 9—9 of FIG. 8;

FIG. 10 is a view similar to FIG. 5 with the indicator-indexer plate in position;

FIG. 11 is a view taken substantially along line 11—11 of FIG. 10;

FIG. 12 is a view of the front rail in the fully extended position;

FIG. 13 is a partially broken view of the saw table showing the front rail in the fully retracted position;

FIG. 14 is a partial end view of the saw table with an adjustable spring loaded bumper stop in position for a rip-cutting operation;

FIG. 15 is a cross sectional view of the adjustable spring loaded bumper stop;

DETAILED DESCRIPTION OF THE INVENTION

Figure 3:
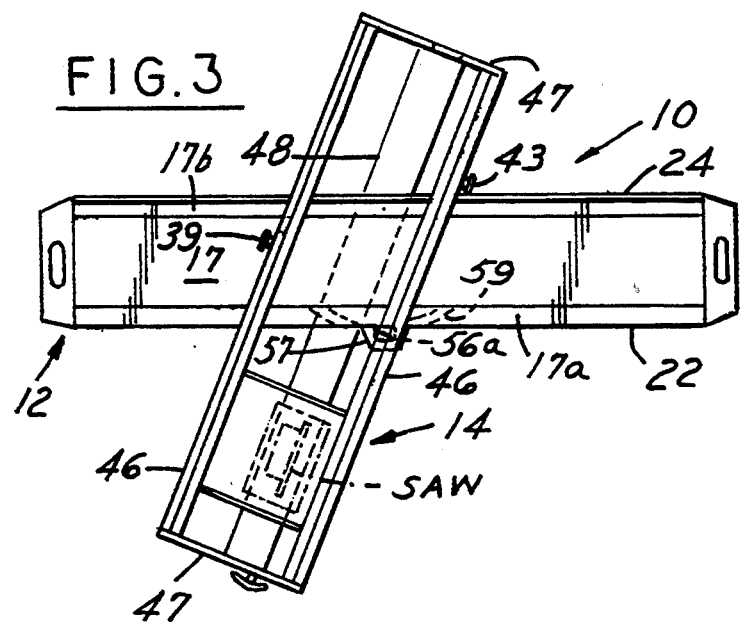
FIG. 3 is a plan view of a saw table according to the present invention with the saw track in a pivoted position and with the extensions of the saw table retracted.

Referring to FIGS. 1-3, the invention comprises a saw table 10 which includes an expandable saw table base 12 and a saw track 14 mounted for pivotable movement thereon.

Referring to FIG. 2, it can be seen that the table base 12 includes a base member 15 having a flat upper surface 16 to accommodate a work table 17. The work table 17 may be made of plastic such as vinyl and has grooves 18 formed along the sides thereof to accommodate a leg 19 of an L-shaped extension 20 on the base member 15. The vinyl work table 17 is removable from the base member 15 by simply sliding across the flat surface 16 past the end of the extensions 20 and may be turned upside down and reinserted to present a clear or unmarred surface upon which to place the workpiece.

The saw table base 12 includes front and back extensions 22, 24. Front extension 22 has a supplemental plastic work surface 17a having a T-shaped groove 25 for accommodating a complimentary T-shaped member 26 on the front extension 22. Similarly, back extension 24 has a supplemental plastic work surface 17b mounted thereon in a like manner. Back extension 24 additionally has an upper extension 27 which serves as a fence for limiting lateral movement of a workpiece.

Adjustability of the table width is accomplished through a system of parallel linkages which includes a pair of front support arms 28, 29 and a front locking arm 32 pivotally connected to the front extension 22 and to the base member 15 to allow the front extension 22 to be swung from the retracted position of FIG. 3 to the extended position of FIG. 1. The back extension 24 is similarly mounted by a pair of back support arms 30, 31 and a back locking arm 33. The support and locking arms of the parallel linkage system are mounted on the base member 15 and to the front and back extension 22, 24 by pivot pins 34, seen most clearly in FIG. 2.

As the front and back extensions 22, 24 are swung from the retracted to the extended position, front and back support arms 28-31 swing about their respective fixed pivots defined by pivot pins 34. However, front and back locking arms 32, 33 are connected to the front and back extensions 22, 24 to slide with respect thereto. The adjustment of the front extension can be seen most clearly in FIGS. 12 and 13 where it is seen that the front locking arm 28 is connected to the base member 15 and to the front extension 22 at each end through fixed pivots 34. The front locking arm 32 is connected to the base member 15 at one end by fixed pivot 34 and is connected to the front extension 22 through a pivot shoe 41 adapted to slide within the front extension 22. When in the retracted positioned of FIG. 13 the front extension 22 may be secured by locking knob 43 similar to locking knob 39 discussed below.

The back locking arm operates in a similar manner and is connected to the back extension 24 and the base member 15 as seen most clearly in FIG. 2. One end of the back locking arm 33 is fixed to the base member to pivot about pivot pin 34 held in a substantially C-shaped pivot pin block 40 secured the base member 15 with a fastener such as a screw 36. The opposite end of the back locking arm 33 is mounted within the C-shaped portion of the back extension 24 through a pivot pin 34 mounted in a pivot shoe 37 adapted to slide along the back extension 24. The back extension 24 is locked in place by locking knob 39 having a screw threaded portion 39' extending into a complimentary threaded hole in the pivot shoe 37 and slidable within slot 38 in the back extension 24. Once the back extension 24 is in the desired positioned, locking knob 39 is tightened to lock the pivot shoe and thus the back locking arm 33 in position.

Referring to FIG. 1, the table length may be expanded by telescopic extensions 44, 45. The extensions 44, 45 are preferably made of telescoping extrusions 44a, 44b and 45a, 45b, the inner most extensions 44a, 44b being telescoped in the table base 12 which is also preferably extruded are accommodated within the housing as seen most clearly in FIG. 2.

Figure 4:
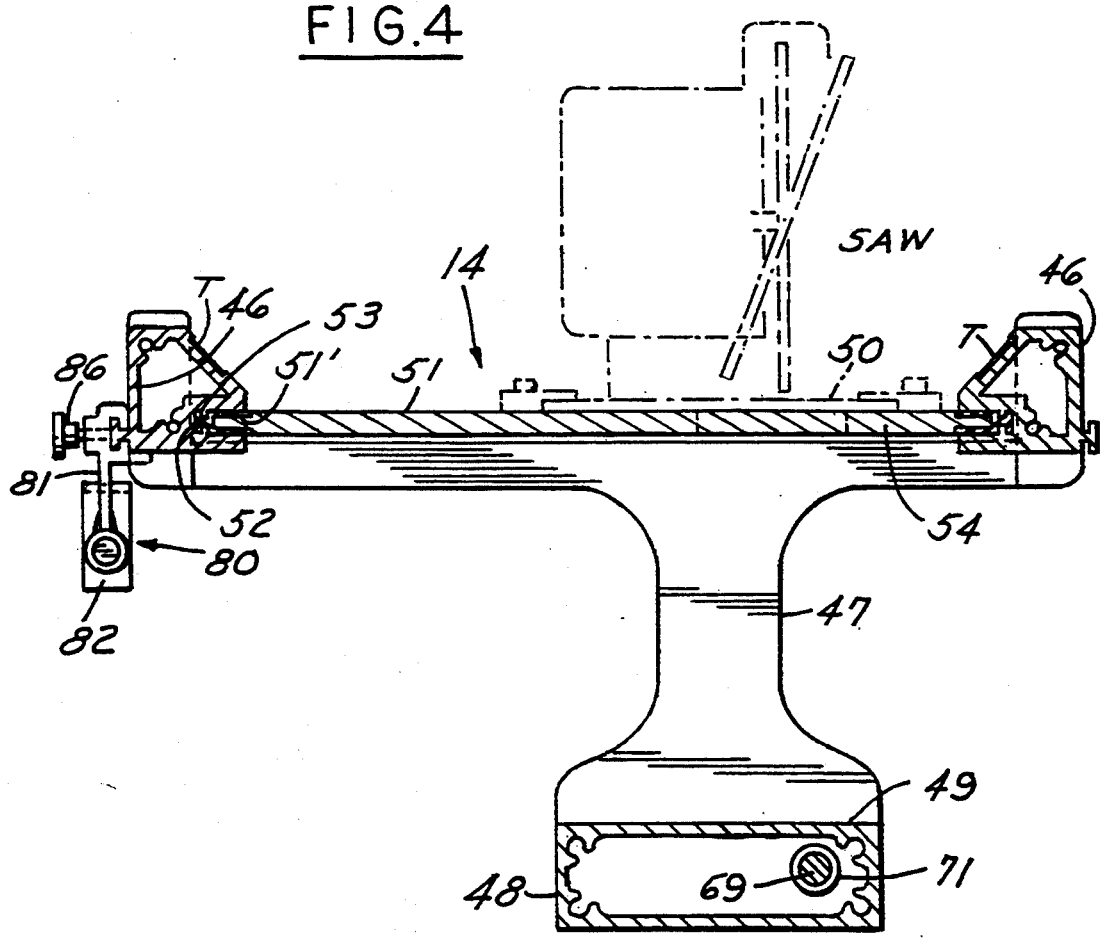
FIG. 4 is a cross sectional view taken substantially along line 4—4 of FIG. 1.
Figure 16:
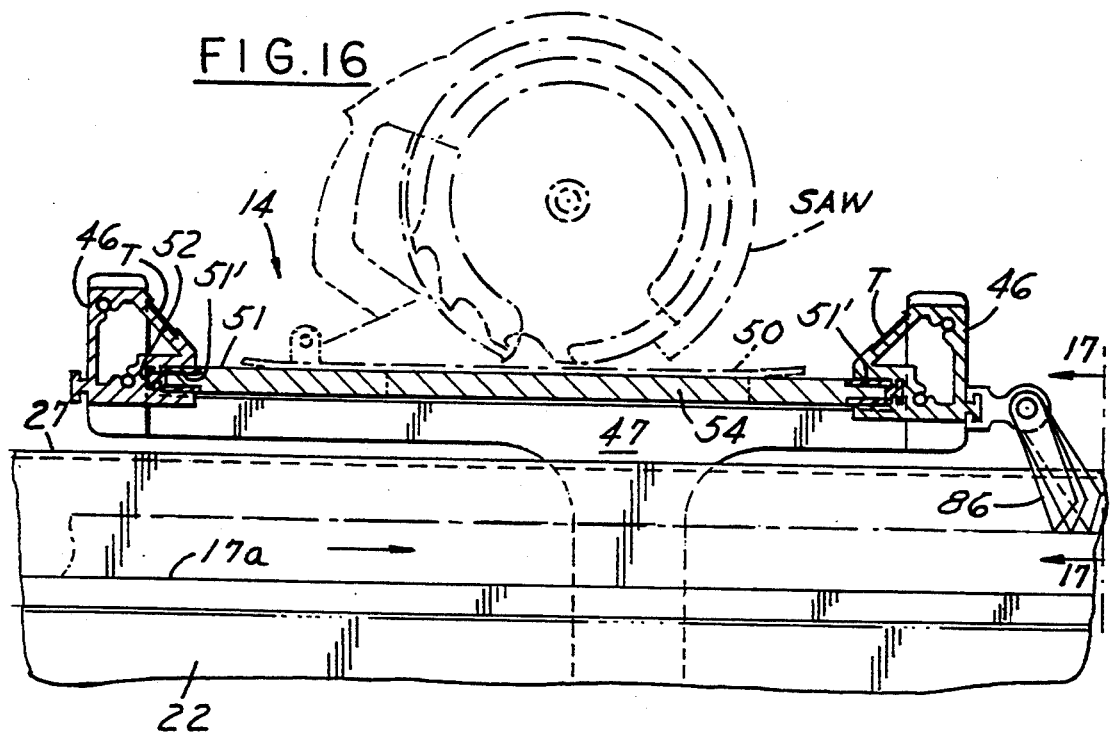
FIG. 16 is a partial cross sectional view of the saw plate assembly mounted in a position for a rip-cutting operation.
Figure 17:
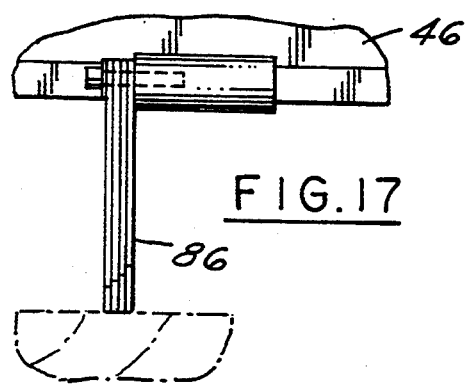
FIG. 17 is a view of the anti-kickback device.

The saw track 14, seen most clearly in FIGS. 4 and 6, includes a pair of tracks 46 mounted at each end by a substantially T-shaped track support 47. A track base 48 is connected to and extends between the bottom of the track supports 47 and has an upper flat surface 49 upon which the table base 12 rests as seen most clearly in FIG. 6. The saw, seen in phantom in FIG. 4, is fixedly mounted to the saw slide 51 by saw shoe plate 50. The saw slide 51 is slidable along the tracks 46 by a C-shaped vinyl guides 51' mounted along the edges of the saw slide 51. The guides 51' have a T-shaped extension receivable in a complimentary groove 53 in the tracks 46. The saw slide 51 also has a groove 54 to accommodate the saw blade during the cutting operation as is well known. During operation, the saw is guided along the tracks 46 by the T-shaped extensions 52 and complimentary grooves 53. If desired, the saw slide 51 may be removable from the tracks by sliding the saw slide 51 past the ends thereof, turning the slide 90° and reinserting it in the track, as seen in FIG. 16 to perform a rip-cutting operation.

Figure 18:
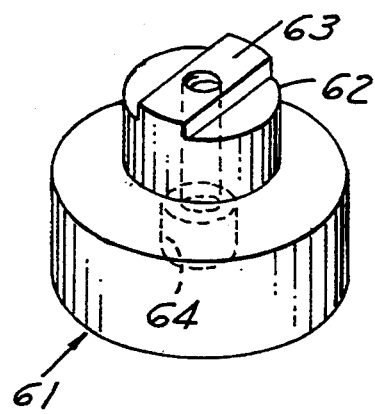
FIG. 18 is a perspective view of the protractor pivot mounting.

The saw track 14 is pivotally mounted on the table base 12 by a novel mount as seen most clearly in FIG. 6. An indicator-indexer plate 55 is fixedly mounted on the bottom of the table base 12 by fasteners such as screws 56a. The indicator-indexer plate 55 has projections 57 around the peripheral edge thereof with rollers 58 rotatably mounted at the free ends of the projections 57. An opening 55a is provided in the plate 55 so that the operator can view indicia on the protractor to accurately position the saw track 14 at the desired position. A protractor 59 is fixedly connected to the base 48 of track 14 by fasteners such as screws 60 and is pivotally connected to the indicator-indexer plate 55 through a protractor pivot mount 61. The pivot mount 61 (FIG. 18) includes a hub 62 having a raised portion 63 to be accommodated in a complimentary slot in the indicator-indexer plate 59 and secured thereto in a non-rotatable manner by a screw 64. Hub 62 is received within an opening in the track base 48 and a back portion of the protractor 59. The base 48 of the saw track 14 engages the surface 61a on the pivot mount 61 (FIG. 18) and the screw 64 is headed and holds the base 48 in pivotal relation to the saw table 12. It can be seen that the entire saw track 14 with the protractor 59 secured thereto may be rotated relative to the table base 12 about the hub 62.

The outer peripheral edge of the protractor 59 is stepped at 59' (FIG. 11) in order to engage the stepped rollers 58 to provide stability and smooth movement of the protractor 59 through the pivoting motion.

In order to lock the saw track 14 in any desired angle, a position stop 67 is provided which will now be described with reference to FIGS. 5 and 7–10. A plurality of selected spaced openings 65 are provided in the indicator-indexer plate 55 and a single opening 66 is provided in the protractor 59. A spring mounted stop member 67 is mounted on the base member 15 by spring 68 which urges the stop member 67 upwardly through an opening in the track base 48 to be normally received within openings 65 and 66 when aligned. A control handle or locking rod 69 is rotatably mounted within the track base 48 with a threaded end 69' received in a threaded opening within a radially split mounting block 70. The mounting block 70 is secured to the track base 48 by fasteners 70b and is mounted about the pivot mount 61 to be rotatable thereabout with the table base 48. The locking rod 69 is received within a locking rod sleeve 71 having a radial slot 72 cut at one end thereof. An extension member 73 is connected to the locking rod sleeve 71. The stop member 67 includes a projection 75 such as a screw and extends beneath the extension 73.

In order to rotate the saw track 14 to the desired angle, locking rod 69 is rotated in a counterclockwise direction until the screw 74 engages the end of the slot 72 in the locking rod sleeve 71 (FIG. 7). Upon continued rotation of the locking rod 69, extension 73 engages projection 75 of the stop 67 and moves the stop against the spring 68 and out of engagement with openings 65, 66 (FIG. 8). The saw track 14 is then pivoted to the desired position where openings 65 and 66 are in alignment. Locking rod 69 is then rotated clockwise raising extension 73 out of engagement with projection 75 so that the stop 67 is urged upwardly by spring 68 into engagement with holes 65, 66 to lock the saw track 14 in place.

If it is desired to lock the saw track in an uncommon angle, i.e. at a position where there are no openings 65 in the indicator plate, the locking rod 69 is further rotated clockwise so that the threaded end thereof tightens the radial split 70a in the mounting block 70 about the pivot mount 61 to frictionally hold the mounting block 70 against rotation about the pivot mount and thus lock the saw track 14 in position.

Referring to FIGS. 14–17, the portable saw is shown in a position in which the saw slide 51 has been removed from the tracks 46 and turned 90° and reinserted therein for a rip-cutting operation.

A spring mounted bumper 80 is slidably mounted to one of the tracks 46 by a bracket 81. The bumper 80 includes a bumper stop 82 biased by spring 83. The bumper stop 82 is frictionally held in the bracket by a pin 84 positioned within slot 85 in shaft portion 82b. The head portion 82a of the bumper stop 82 has a curved outer surface 82c and an outwardly extending lip 82d which overlies the top of a workpiece, such as vinyl siding, to stabilize the workpiece against both the fence 27 and against the work table. The bumper stop 80 is secured to the rail 46 by fasteners such as a screw 86. It can be seen that during the rip-cutting operation, the workpiece is guided between the fence 27 and the bumper stop 82. The spring 83 allows the bumper stop 82 to accommodate for irregularities in the side of the workpiece but still securely guide the workpiece on the work table. An anti-kickback device 85 (FIGS. 16 and 17) may also be connected to one of the tracks 46 to help secure the workpiece and avoid injury. The device 85 provides a plurality of fingers pivotally suspended from the track and having teeth that engage a workpiece to prevent movement thereof.

As shown in FIGS. 1, 2 and 4 measuring tapes T are provided in recesses in the table base 12, saw track 13, and extensions 44,45.

It can thus be seen that there has been provided a saw table which utilizes a standard power tool such as a saw or router; which can be used to provide a wide range of angular positions relative to a workpiece; and which can be positioned to operate in two positions at a right angle to one another.

We claim:

1. A portable saw table for a portable power saw or a portable router comprising:
    a table base having a front and back,
    a saw track having a track base,
    said saw track comprising front and back track supports, a pair of track means mounted on said track supports, said table base being mounted between said track supports and underlying said pair of track means,
    pivot means on said table base for pivotally supporting said saw track on said table base adjacent the back of said table base about a pivot axis such that said pair of track means overlies said table base and said table base is mounted between said pair of track means and said track base and such that said track has angular movement relative to said base,
    a saw slide for supporting said portable power saw or said portable router slidably supported on said track means of said saw track,
    protractor means fixedly mounted on said track base of said saw track,
    said protractor means having a protractor axis aligned with the pivot axis,
    indicator means fixedly mounted on said table base for indicating pivotal movement of said saw track and interconnected to said protractor means by said pivot means,
    said protractor means having arcuate outer peripheral edge bearing indicia,
    said protractor means having a radius extending from the protractor axis such that only a portion of the arcuate edge bearing indicia extend beyond the front of the table base throughout the angular movement of said saw track relative to said table base and said protractor means having a radius extending from said protractor axis such that the arcuate edge bearing indicia are viewable by an operator facing the front of said table base throughout the angular movement of said track relative to said table base.

2. The portable saw table set forth in claim 1 further comprising means for locking said saw track in an adjusted position on said table base.

3. The portable saw table set forth in claim 1 wherein said pivot means comprises means for fixedly connecting the pivot means to said indicator means and,
    hub means for pivotally supporting said track base and said protractor means.

4. The portable saw table set forth in claim 1 wherein said saw slide comprises a substantially square member on which the portable saw or the router is mounted, said saw track being constructed and arranged such that the saw slide is removable and rotatable 90° to receive said saw slide in one of four positions.

5. The portable saw table set forth in claim 4 wherein said square member is a plate.

6. The portable saw table set forth in claim 1 including dual telescoping extension members, one extension member being telescoped within the other, said table having an end with an opening telescopically receiving the other of said extension members.

7. The portable saw table set forth in claim 1 including leg means for supporting said portable saw table.

8. The portable saw table set forth in claim 7 wherein said leg means are connected to said table.

9. A portable saw table for a portable power saw or portable router comprising:
    a table base,
    pivot means,
    a saw track pivotally mounted on said table base,
    a saw slide for supporting the portable power saw or the portable router slidably supported on said saw track,
    protractor means fixedly mounted on said saw track,
    indicator means fixedly mounted on said table base for indicating pivotal movement of said saw track and interconnected to said protractor means by said pivot means, and
    means for locking said saw track in an adjusted position to said table base,
    said locking means comprising a spring mounted stop member within said track for engaging both said protractor means and said indicator means for preventing relative rotation therebetween, and
    means for releasing said stop member to allow pivoting of said saw track relative to said table base.

10. The portable saw table set forth in claim 9 wherein said means for releasing said stop member comprises
    a locking rod,
    a locking rod sleeve through which said locking rod extends,
    a laterally extending projection on said locking rod sleeve, and
    an extension on said stop member positioned substantially beneath said projection so that upon rotation of said locking rod, said projection of the locking rod sleeve engages said extension to move the stop member to a release position.

11. The portable saw table set forth in claim 10 further comprising additional locking means comprising
    a split mounting block mounted on said pivot means and having a threaded opening receiving a threaded end of said locking rod sleeve so that the mounting block grips the pivot means as the locking rod sleeve is rotated to frictionally hold said saw track against rotation.

12. A portable saw table for a portable power saw or a portable router comprising:
   a table base including a base member,
   a saw track pivotally mounted on said table base,
   pivot means on said table base for pivotally supporting said track on said table base,
   a saw slide for supporting the portable power saw or the portable router slidably supported on said saw track,
   protractor means fixedly mounted on said saw track,
   indicator means fixedly mounted on said table base for indicating pivotal movement of said saw track and interconnected to said protractor means by said pivot means, and
   said table base comprising,
   said base member having a flat upper surface,
   a work table on said flat upper surface of said base member,
   guide means comprising upstanding inwardly extending projections along side edges of said base member and
   grooves extending along opposite sides of said work table for receiving the projections on said guide means.

13. The portable saw table as set forth in claim 12 wherein said work table is a removable and reversible plastic member.

14. The portable saw table set forth in claim 12 wherein said pivot means comprises means for fixedly connecting the pivot means to said indicator means and,
   hub means for pivotally supporting said track and said protractor means.

15. The portable saw table set forth in claim 12 wherein said indicator means is a plate having a substantially arcuate edge and which overlies said protractor means and has spaced projections about the arcuate edge, and
   rollers mounted on the projections for guiding an arcuate edge of said protractor means.

16. The portable saw table set forth in claim 12 comprising front and back lateral extension means, each lateral extension means comprising an extension,
   a support arm connected to said table base and said extension by fixed pivots,
   a locking arm means connected to said table base by a first pivot at one end and slidably connected at the other end to said extension through a sliding pivot sleeve, and
   means to lock the sliding pivot sleeve and thus the locking arm means in position.

17. The portable table saw set forth in claim 16 wherein said means to lock the sliding pivot sleeve comprises
   a locking knob having a threaded end extending through and slidable along an elongated slot in the extension and into a threaded opening in the sliding pivot sleeve so that upon tightening of the locking knob, the sliding pivot sleeve is brought into frictional engagement with the extension to prevent movement.

18. The portable saw table set forth in claim 12 wherein said saw slide comprises a substantially square member on which the portable saw or the router is mounted, said saw track being constructed and arranged such that the saw slide is removable and rotatable 90° to receive said saw slide in one of four positions.

19. The portable saw table set forth in claim 18 wherein said square member is a plate.

20. The portable saw table set forth in claim 12 including dual telescoping extension members, one extension member being telescopically received within the other, and the other being telescoped in an end of said table base.

21. A portable saw table for a portable power saw or a portable router comprising:
   a table base,
   a saw track pivotally mounted on said table base,
   pivot means on said table base for pivotally supporting said saw track on said table base,
   a saw slide for supporting the portable power saw or the portable router slidably supported on said saw track,
   protractor means fixedly mounted on said saw track,
   indicator means fixedly mounted on said table base for indicating pivotal movement of said saw track and interconnected to said protractor means by said pivot means, and
   means for locking said saw track in an adjusted position on said table base,
   said locking means comprising
   a locking rod mounted within said track,
   a spring loaded stop within said track for engaging both said protractor means and said indicator means for preventing relative rotation therebetween, and
   means for releasing said stop to allow pivoting of said saw track relative to said table base.

22. The portable saw table set forth in claim 21 wherein said means for releasing said stop comprises
   a locking rod sleeve through which said locking rod extends,
   a laterally extending projection on said locking rod sleeve, and
   an extension on said stop positioned substantially beneath said projection so that upon rotation of said locking rod, said projection of the locking rod sleeve engages said extension to move the stop to a release position.

23. The portable saw table set forth in claim 22 further comprising additional locking means comprising
   a split mounting block mounted on said pivot means and having a threaded opening for receiving a threaded end of said locking rod so that the mounting block grips the pivot means as the locking rod is rotated to frictionally hold said saw track against rotation.

24. The portable saw table set forth in claim 22 wherein said indicator means has a plurality of spaced openings, and
   said protractor means has an opening for receiving said stop when the opening in said protractor means is aligned with one of the spaced openings in the indicator means.

25. A portable saw table for a portable power saw or a portable router comprising:
   a table base having a base member,
   a saw track having a track base,
   said saw track comprising front and back track supports on said track base, a pair of track means mounted on said track supports,
   a work table mounted between said track supports and underlying said pair of track means,
   pivot means on said table base for pivotally supporting said saw track on said table base such that said pair of track means overlies said table base and said table base is mounted between said pair of track means and said track base, a saw slide for supporting said portable power saw or said portable router slidably supported on said saw track, protractor means fixedly mounted on said saw track, indicator means fixedly mounted on said table base for indicating pivotal movement of said saw track and interconnected to said protractor means by said pivot means, guide means comprising upstanding inwardly extending projections along side edges of said base member, and grooves extending along opposite side of said work table for receiving the projections on said guide means.

26. The portable saw table set forth in claim 25 wherein said work table is a removable and reversible plastic member.

27. A portable saw table for a portable power saw or a portable router comprising:

a table base, a saw track having a track base, said saw track comprising front and back track supports, a pair of track means mounted on said track supports, and a work table mounted between said track supports and underlying said pair of track means, pivot means on said table base for pivotally supporting said saw track on said table base such that said pair of track means overlies said table base and said table base is mounted between said pair of track means and said track base, a saw slide for supporting said portable power saw or said portable router slidably supported on said saw track, protractor means fixedly mounted on said saw track, indicator means fixedly mounted on said table base for indicating pivotal movement of said saw track and interconnected to said protractor means by said pivot means, said protractor means having a radius extending from the protractor axis such that only a portion of the arcuate edge bearing indicia extend beyond the front of the table base throughout the angular movement of said saw track relative to said table base and said protractor means having a radius extending from said protractor axis such that the arcuate edge bearing indicia are viewable by an operator facing the front of said table base throughout the angular movement of said track relative to said table base, means for locking said saw track in an adjusted position on said table base.

28. The portable saw table set forth in claim 27 wherein said locking means comprises a locking rod mounted within said track base, a spring loaded stop within said track base for engaging both said protractor means and said indicator means for preventing relative rotation therebetween, and means for releasing said stop to allow pivoting of said saw track relative to said table base.

29. The portable saw table set forth in claim 28 wherein said means for releasing said stop comprises a locking rod sleeve through which said locking rod extends, a laterally extending projections on said locking rod sleeve, and an extension on said stop positioned substantially beneath said projection so that upon rotation of said locking rod, said projection of the locking rod sleeve engages said extension to move the stop to a release position.

30. The portable saw table set forth in claim 28 further comprising additional locking means comprising a split mounting block mounted on said pivot means and having a threaded opening receiving a threaded end of said locking rod so that the mounting block grips the pivot means as the locking rod is rotated to frictionally hold said saw track against rotation.

31. A portable saw table for a portable power saw or a portable router comprising:

a table base, a saw track, said saw track comprising front and back track supports, a pair of track means mounted on said track supports, and a track base mounted between said track supports and underlying said pair of track means, pivot means on said table base for pivotally supporting said saw track on said table base such that said pair of track means overlies said table base and said table base is mounted between said pair of track means and said track base, a saw slide for supporting said portable power saw or said portable router slidably supported on said saw track, protractor means fixedly mounted on said saw track, indicator means fixedly mounted on said table base for indicating pivotal movement of said saw track and interconnected to said protractor means by said pivot means, said indicator means is a plate having a substantially arcuate edge and which overlies said protractor and has spaced projections about the arcuate edge, and means mounted on the projections for guiding an arcuate edge of said protractor means.

32. A portable power saw table for a portable saw or a portable router comprising:

a table base, a saw track, said saw track comprising front and back track supports, a pair of track means mounted on said track supports, and a track base mounted between said track supports and underlying said pair of track means, pivot means on said table base for pivotally supporting said saw track on said table base such that said pair of track means overlies said table base and said table base is mounted between said pair of track means and said track base, a saw slide for supporting said portable power saw or said portable router slidably supported on said saw track, protractor means fixedly mounted on said saw track, indicator means fixedly mounted on said table base for indicating pivotal movement of said saw track and interconnected to said protractor means by said pivot means, front and back lateral extension means, each lateral extension means comprising an extension, a support arm connected to said table base and said extension by fixed pivots, a locking arm means connected to said table base by a first pivot at one end and slidably connected at the other end to said extension through a sliding pivot sleeve, and means to lock the sliding pivot sleeve and thus the locking arm means in position, said means to lock the sliding pivot sleeve comprising a locking knob having a threaded end extending through and slidable along an elongated slot in the extension and into a threaded opening in the sliding pivot sleeve so that upon tightening of the locking knob, the sliding pivot sleeve is brought into frictional engagement with the extension to prevent movement.

33. A portable saw table for a portable power saw or a portable router comprising:

a table base having a front and back, a saw track having a track base, said saw track comprising front and back track supports, a pair of track means mounted on said track supports, said table base being mounted between said track supports and underlying said pair of track means, pivot means on said table base for pivotally supporting said track base of said saw track on said table base adjacent the back of said table base about a pivot axis such that said pair of track means overlies said table base and said table base is mounted between said pair of track means and said track base and such that said track has angular movement relative to said base, a saw slide for supporting said portable power saw or said portable router slidably supported on said track means of said saw track, protractor means fixedly mounted on said track base of said saw track, said protractor means having a protractor axis aligned with the pivot axis, indicator means fixedly mounted on said table base for indicating pivotal movement of said saw track and interconnected to said protractor means by said pivot means, said protractor means having arcuate outer peripheral edge bearing indicia and having an indicator axis aligned with the axis of said pivot axis and protractor axis, said protractor means having a radius such that the arcuate edge bearing indicia are viewable by an operator facing the front of said table base throughout the angular movement of said track relative to said table base, said table base comprising a base member, said base member having a flat upper surface, a work table on said flat upper surface, guide means comprising upstanding inwardly extending projections along side edges of said base member, and grooves extending along opposite side of said work table for receiving the projections on said guide means.

34. The portable saw table set forth in claim 33 wherein said work table is a removable and reversible plastic member.

35. A portable saw table for a portable power saw or a portable router comprising:

a table base having a front and back, a saw track having a track base, said saw track comprising front and back track supports, a pair of track means mounted on said track supports, said table base being mounted between said track supports and underlying said pair of track means, pivot means on said table base for pivotally supporting said track base of said saw track on said table base adjacent the back of said table base about a pivot axis such that said pair of track means overlies said table base and said table base is mounted between said pair of track means and such that said track has angular movement relative to said base, a saw slide for supporting said portable power saw or said portable router slidably supported on said track means of said saw track, protractor means fixedly mounted on said track base of said saw track, said protractor means having a protractor axis aligned with the pivot axis, indicator means fixedly mounted on said table base for indicating pivotal movement of said saw track and interconnected to said protractor means by said pivot means, said protractor means having arcuate outer peripheral edge bearing indicia and having a radius aligned with the axis of said pivot axis and protractor axis, said protractor means having a radius extending from the protractor axis such that the arcuate edge bearing indicia extend beyond the table base and such that the arcuate edge bearing indicia are viewable by an operator facing the front of said table base throughout the angular movement of said track relative to said table base, means for locking said saw track in an adjusted position on said table base, said locking means comprising a locking rod mounted within said track base, a spring loaded stop within said track base for engaging both said protractor means and said indicator means for preventing relative rotation therebetween, and means for releasing said stop to allow pivoting of said saw track relative to said table base.

36. The portable saw table set forth in claim 35 wherein said means for releasing said stop comprising a locking rod sleeve through which said locking rod extends, a laterally extending projection on said locking rod sleeve, and an extension on said stop positioned substantially beneath said projection so that upon rotation of said locking rod, said projection of the locking rod sleeve engages said extension to move the stop to a release position.

37. The portable saw table set forth in claim 35 further comprising additional locking means comprising a split mounting block mounted on said pivot means and having a threaded opening receiving a threaded end of said locking rod so that the mounting block grips the pivot means as the locking rod is rotated to frictionally hold said saw track against rotation.

38. The portable saw table set forth in claim 35 wherein said indicator means has a plurality of spaced openings, and said protractor means has an opening for receiving said stop when the opening in said protractor means is aligned with one of the spaced openings in the indicator means.

39. A portable saw table for a portable power saw or a portable router comprising:
   a table base having a front and back,
   a saw track having a track base,
   said saw track comprising front and back track supports, a pair of track means mounted on said track supports, said table base being mounted between said track supports and underlying said pair of track means,
   pivot means on said table base for pivotally supporting said track base of said saw track on said table base adjacent the back of said table base about a pivot axis such that said pair of track means overlies said table base and said table base is mounted between said pair of track means and said track base and such that said track has angular movement relative to said base,
   a saw slide for supporting said portable power saw or said portable router slidably supported on said track means of said saw track,
   protractor means fixedly mounted on said track base of said saw track,
   said protractor means having a protractor axis aligned with the pivot axis,
   indicator means fixedly mounted on said table base for indicating pivotal movement of said saw track and interconnected to said protractor means by said pivot means,
   said protractor means having arcuate outer peripheral edge bearing indicia and having an indicator axis aligned with the axis of said pivot axis and protractor axis,
   said protractor means having a radius such that the arcuate edge bearing indicia are viewable by an operator facing the front of said table base throughout the angular movement of said track relative to said table base,
   said indicator means comprising a plate having a substantially arcuate edge and which overlies said protractor means and has spaced projections about the arcuate edge, and
   rollers mounted on the projections for guiding an arcuate edge of said protractor means.

40. A portable saw table for a portable power saw or a portable router comprising:
   a table base having a front and back,
   a saw track having a track base,
   said saw track comprising front and back track supports, a pair of track means mounted on said track supports, said table base being mounted between said track supports and underlying said pair of track means,
   pivot means on said table base for pivotally supporting said track base of said saw track on said table base adjacent the back of said table base about a pivot axis such that said pair of track means overlies said table base and said table base is mounted between said pair of track means and said track base and such that said track has angular movement relative to said base,
   a saw slide for supporting said portable power saw or said portable router slidably supported on said track means of said saw track,
   protractor means fixedly mounted on said track base of said saw track,
   said protractor means having a protractor axis aligned with the pivot axis,
   indicator means fixedly mounted on said table base for indicating pivotal movement of said saw track and interconnected to said protractor means by said pivot means,
   said protractor means having arcuate outer peripheral edge bearing indicia and having an indicator axis aligned with the axis of said pivot axis and protractor axis,
   said protractor means having a radius such that the arcuate edge bearing indicia are viewable by an operator facing the front of said table base throughout the angular movement of said track relative to said table base,
   front and back lateral extension means each lateral extension means comprising an extension,
   a support arm connected to said table base and said extension by fixed pivots,
   a locking arm means connected to said table base by first pivot at one end and slidably connected at the other end to said extension through a sliding pivot sleeve, and
   means to lock the sliding pivot sleeve and thus the locking arm means in position.

41. The portable table saw set forth in claim 40 wherein said means to lock the sliding pivot sleeve comprises
   a locking knob having a threaded end extending through and slidable along an elongated slot in the extension and into a threaded opening in the sliding pivot sleeve so that upon tightening of the locking knob, the sliding pivot sleeve is brought into frictional engagement with the extension to prevent movement.

* * * * *